United States Patent
Yang et al.

(10) Patent No.: US 10,303,428 B2
(45) Date of Patent: May 28, 2019

(54) ELECTRONIC DEVICE WITH A FUNCTION OF SMART VOICE SERVICE AND METHOD OF ADJUSTING OUTPUT SOUND

(71) Applicant: Unlimiter MFA Co., Ltd., Eden Island (SC)

(72) Inventors: Kuo-Ping Yang, Taipei (TW); Kuan-Li Chao, Taipei (TW); Ho-Hsin Liao, Taipei (TW)

(73) Assignee: UNLIMITER MFA CO., LTD., Eden Island (SC)

( * ) Notice: Subject to any disclaimer, the term of this patent is extended or adjusted under 35 U.S.C. 154(b) by 37 days.

(21) Appl. No.: 15/822,412

(22) Filed: Nov. 27, 2017

(65) Prior Publication Data
US 2019/0065136 A1    Feb. 28, 2019

(30) Foreign Application Priority Data
Aug. 30, 2017    (TW) .............................. 106129516 A

(51) Int. Cl.
| | |
|---|---|
| *G10L 21/00* | (2013.01) |
| *G06F 3/16* | (2006.01) |
| *G10L 17/22* | (2013.01) |
| *G10L 17/06* | (2013.01) |
| *G10L 17/00* | (2013.01) |
| *G10L 15/22* | (2006.01) |
| *G10L 17/04* | (2013.01) |
| *G06K 9/00* | (2006.01) |
| *G06F 3/0488* | (2013.01) |
| *G10L 15/30* | (2013.01) |

(52) U.S. Cl.
CPC ............ *G06F 3/165* (2013.01); *G06F 3/0488* (2013.01); *G06K 9/00892* (2013.01); *G10L 15/22* (2013.01); *G10L 15/30* (2013.01); *G10L 17/005* (2013.01); *G10L 17/04* (2013.01); *G10L 17/06* (2013.01); *G10L 17/22* (2013.01); *G10L 2015/223* (2013.01)

(58) Field of Classification Search
CPC ....... G10L 15/22; G10L 17/00; G10L 17/005; G10L 19/167; G10L 19/22; G10L 15/02; G10L 15/142; G10L 15/187; G10L 17/22; G10L 17/26; G10L 21/003; G10L 21/034; G10L 25/84; G06F 3/017; G06F 3/167; G06F 1/1694; G06F 21/32; G06F 3/0346; G06F 3/04817; G06F 3/0482; G06F 3/04883; G06F 9/453; G06F 3/0488; H04S 1/007; H04S 7/30; H04S 7/302; H04S 7/305; H04N 21/4122; H04N 21/4131; H04N 21/42201; H04N 21/42203; H04N 21/43615; H04N 21/4415; H04N 7/181
USPC ............ 704/270, 270.1, 275, 273, 246, 231; 715/708; 379/88.02
See application file for complete search history.

(56) References Cited

U.S. PATENT DOCUMENTS

| | | | |
|---|---|---|---|
| 6,813,490 B1 * | 11/2004 | Lang ................... | H04M 1/6016 455/414.1 |
| 7,280,970 B2 * | 10/2007 | Tamir ................... | B32B 37/182 704/246 |

(Continued)

*Primary Examiner* — Vijay B Chawan
(74) *Attorney, Agent, or Firm* — Bacon & Thomas, PLLC

(57) ABSTRACT

An electronic device with a function of smart voice service is disclosed. The electronic device is capable of identifying a user who is using the function of smart voice service and of adjusting the frequency of output sound to answer according to the hearing state of the user.

16 Claims, 3 Drawing Sheets

(56) References Cited

U.S. PATENT DOCUMENTS

| | | | | |
|---|---|---|---|---|
| 9,489,949 | B2* | 11/2016 | Tamir | G07C 9/00087 |
| 9,929,709 | B1* | 3/2018 | Yang | H03G 3/32 |
| 10,115,400 | B2* | 10/2018 | Wilberding | G10L 15/30 |
| 2010/0119093 | A1* | 5/2010 | Uzuanis | H04R 25/70 |
| | | | | 381/312 |
| 2011/0258544 | A1* | 10/2011 | Dinh-Trong | H04L 67/14 |
| | | | | 715/708 |
| 2013/0218571 | A1* | 8/2013 | Tamir | G07C 9/00087 |
| | | | | 704/273 |
| 2015/0023481 | A1* | 1/2015 | Wu | H04M 3/4936 |
| | | | | 379/88.02 |
| 2016/0300567 | A1* | 10/2016 | Dong | G10L 15/08 |
| 2017/0094511 | A1* | 3/2017 | Na | H04W 4/80 |
| 2017/0109011 | A1* | 4/2017 | Jiang | G06F 1/1694 |
| 2017/0270919 | A1* | 9/2017 | Parthasarathi | G10L 15/20 |
| 2017/0339503 | A1* | 11/2017 | Lyren | H04S 1/007 |
| 2018/0040324 | A1* | 2/2018 | Wilberding | G10L 15/30 |
| 2018/0048479 | A1* | 2/2018 | Lin | H04N 21/4415 |
| 2018/0068653 | A1* | 3/2018 | Trawick | G10L 15/187 |
| 2018/0084359 | A1* | 3/2018 | Lyren | H04S 1/007 |
| 2018/0204589 | A1* | 7/2018 | Suto | G11B 5/315 |

* cited by examiner

| Interactor | Facial image data 911 | Fingerprint data 912 | Voiceprint data 913 | Hearing parameter data 92 | Age data 93 | Gender data 94 |
|---|---|---|---|---|---|---|
| U1 | 00101AE774 | CD01121 | DD3310 | 101010102020303030 | 43 | Male |
| U2 | 10101BF051 | AF31456 | FC8850 | 101010101010102020 | 41 | Female |
| U3 | 01000AG222 | AB23456 | AFB799 | 101020204050606060 | 80 | Male |
| U4 | 10010CF123 | FB64795 | CBA033 | 101010101010101010 | 17 | Female |
| U5 | 00010FA311 | FBA3145 | AB7280 | 101010101010101010 | 15 | Male |

FIG. 2

ELECTRONIC DEVICE WITH A FUNCTION OF SMART VOICE SERVICE AND METHOD OF ADJUSTING OUTPUT SOUND

BACKGROUND OF THE INVENTION

1. Field of the Invention

The present invention relates to an electronic device with a function of smart voice service; more particularly, the present invention relates to an electronic device capable of outputting an answer voice message according to a hearing state of a user.

2. Description of the Related Art

With continuous innovation and developments in technology, household electric appliance intelligentization has become a major trend in developing household electrical appliances. Household electrical appliances such as refrigerators, air conditioners and televisions are gradually equipped with high-end operation processing functions for providing smart management. Current smart appliances can inform a user of a usage state of the electric appliance via a simple voice system or even interact with the user. However, the voice output of such electrical appliances is usually designed for a user with normal hearing. As such, the frequency of the output sound might sound unclear to an elderly user or a user with impaired hearing.

Therefore, there is a need to provide an electronic device with a function of smart voice service and method of an adjusting output sound to mitigate and/or obviate the aforementioned problems.

SUMMARY OF THE INVENTION

It is an object of the present invention to provide an electronic device with a function of smart voice service capable of adjusting the frequency of an output sound.

To achieve the abovementioned objects, the electronic device with a function of smart voice service of the present invention comprises a speaker, a memory, an input device and a processing unit. The input device is used for acquiring recognition feature data of a user. The input device includes a microphone, and the microphone is used for receiving a voice message made by the user. The processing unit is electrically connected to the speaker, the memory and the input device. The processing unit includes a file creation module, an identity recognition module, an answer message acquisition module and a sound adjustment module. The file creation module is used for creating an interactor database and storing the interactor database in the memory. The interactor database includes identification data and hearing parameter data of a plurality of interactors. The identity recognition module is used for analyzing the recognition feature data so as to obtain identity verification data, and for comparing the identity verification data with the identification data of the plurality of interactors in order to obtain the corresponding hearing parameter data. The answer message acquisition module is used for acquiring a corresponding original answer voice message appropriate for answering the voice message. The sound adjustment module is used for adjusting the original answer voice message according to the hearing parameter data so as to generate an adjusted answer voice message. The speaker can selectively output either the original answer voice message or the adjusted answer voice message, or output both the original answer voice message and the adjusted answer voice message in turns.

The present invention further provides a method of adjusting output sound, which is applicable for being used in an electronic device with a function of smart voice service. The method comprises the following steps: creating and storing an interactor database, wherein the interactor database includes identification data and hearing parameter data of a plurality of interactors; acquiring recognition feature data of a user and a voice message made by the user; analyzing the recognition feature data so as to obtain identity verification data, and comparing the identity verification data with the identification data of the plurality of interactors in order to obtain the corresponding hearing parameter data; acquiring a corresponding original answer voice message appropriate for answering the voice message; adjusting the original answer voice message according to the hearing parameter data, so as to generate an adjusted answer voice message; and selectively outputting either the original answer voice message or the adjusted answer voice message, or outputting both the original answer voice message and the adjusted answer voice message in turns.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views:

FIG. 2 illustrates an exemplary schematic drawing of an interactor database according to the present invention.

DETAILED DESCRIPTION OF THE PREFERRED EMBODIMENT

Figure 1:
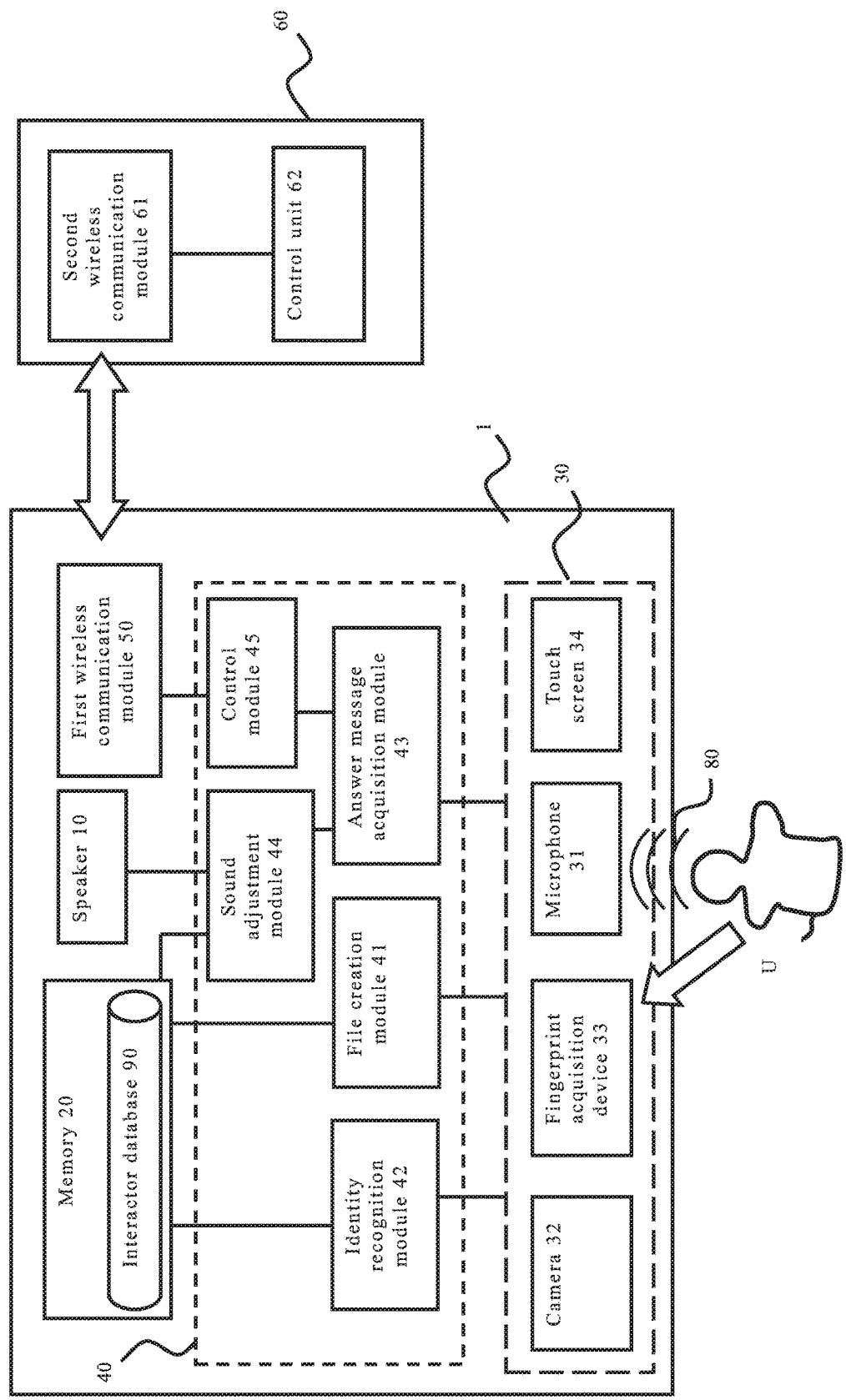
FIG. 1 illustrates a structural drawing of an electronic device with a function of voice service according to the present invention.

Please refer to both FIG. 1 and FIG. 2. FIG. 1 illustrates a structural drawing of an electronic device with a function of voice service according to the present invention, and FIG. 2 illustrates an exemplary schematic drawing of an interactor database according to the present invention.

As shown in FIG. 1, in one embodiment of the present invention, the electronic device 1 with a function of smart voice service of the present invention is connected to a controlled electronic device 60. In this embodiment, the controlled electronic device 60 is, but not limited to, an air conditioner with a wireless communication function. The controlled electronic device 60 can also be a lamp, a television, a fan or other equivalent electronic device with a wireless communication function. The controlled electronic device 60 comprises a second wireless communication module 61 and a control unit 62.

In one embodiment of the present invention, the electronic device 1 of the present invention comprises a speaker 10, a memory 20, an input device 30, a processing unit 40 and a first wireless communication module 50. The processing unit 40 is electrically connected to the speaker 10, the memory 20, the input device 30 and the first wireless communication module 50. The electronic device 1 can wirelessly communicate with the controlled electronic device 60 via the connection established between the first wireless communication module 50 and the second wireless communication module 61. According to the embodiment of the present invention, the first wireless communication module 50 and the second wireless communication module 61 are, but not limited to, Bluetooth devices.

In one embodiment of the present invention, the input device 30 is used for acquiring recognition feature data of a user U, such as but not limited to a facial image, fingerprint or voice of the user U. The recognition feature data can also be an iris image of the user U. In the embodiment of the present invention, the input device 30 includes a microphone 31, a camera 32, a fingerprint acquisition device 33 and a touch screen 34. The microphone 31 is used for receiving a voice message 80 (a sound) made by the user U; the camera 32 is used for acquiring a facial image of the user U; and the fingerprint acquisition device 33 is used for acquiring a fingerprint of the user U.

In one embodiment of the present invention, the processing unit 40 of the present invention includes a file creation module 41, an identity recognition module 42, an answer message acquisition module 43, a sound adjustment module 44 and a control module 45. Please note that each of the above modules can be configured as a hardware device, a software program, a firmware or a combination thereof; it can also be configured by means of a circuit loop or other appropriate arrangement. Further, each of the modules can be either configured independently or combined with one another. In a preferred embodiment, each of the modules is a software program stored in the memory, and functions of the present invention are achieved by means of using a processor (not shown in figures) to execute each module. Please note that to avoid redundancy, the embodiments disclosed in this specification are only preferred embodiments of the present invention without disclosing all possible variations and combinations in detail. However, it should be understood by those skilled in the art that the abovementioned modules or components are not all necessarily essential. Moreover, in order to implement the present invention, it is also possible to include other known modules or components in more detail. Each module or component can be omitted or altered according to different requirements, and it is possible that other modules or components may exist between any two modules.

In one embodiment of the present invention, the file creation module 41 is used for creating an interactor database 90 and for storing the interactor database 90 in the memory 20. The interactor database 90 includes identification data 91 and hearing parameter data 92 of a plurality of interactors. The hearing parameter data 92 includes hearable minimum volume data of each of the interactors with respect to sounds at different frequencies. As shown in FIG. 2, in this embodiment, the identification data 91 includes facial image data 911, fingerprint data 912 and voiceprint data 913 of the interactors. The data can be inputted by potential interactors, such as each of the members of one family. The creation of the interactor database 90 can be implemented according to the following examples without limiting the scope of the present invention.

First, multiple interactors can input setting instructions through operations of the touch screen 34, so as to activate the electronic device 1 to enter a setting mode. Under the setting mode, the electronic device 1 displays information via the touch screen 34 for requesting the interactor to input his/her own recognition feature data such as a facial image, fingerprint or voice. Then the interactor can choose to turn his/her face toward the camera 32, such that the camera 32 can acquire the facial image of the interactor, and then the file creation module 41 will obtain facial image data 911 of the interactor according to a facial image feature analysis result; and/or input a fingerprint via the fingerprint acquisition device 33 so that the file creation module 41 will obtain fingerprint data 912 of the interactor according to a feature recognition result of the inputted fingerprint; and/or make a sound toward the microphone 31 so that the microphone 31 will receive the sound and then the file creation module 41 will obtain voiceprint data 913 of the interactor according to a voice feature analysis result. After the setting of the identification data 91 is completed, the electronic device 1 displays information via the touch screen 34 and requests the interactor to input his/her age and gender. After the interactor inputs his/her age data 93 and gender data 94 via the touch screen 34, the file creation module 41 will search for corresponding hearing parameter data 92 according to the age data 93 and the gender data 94 inputted by the interactor (wherein the correlation will be pre-recorded in the memory 20), and will create a corresponding relationship for the hearing parameter data 92, the facial image data 911 and/or the fingerprint data 912 and/or the voiceprint data 913. Finally, the interactor database 90 is stored to the memory 20.

Please note that in other embodiments, the interactor can also directly input his/her hearing parameter data 92 after completing the setting of the identification data 91, or the electronic device 1 can provide a test procedure to obtain the hearing parameter data 92 after the interactor completes the test procedure.

In one embodiment of the present invention, the identity recognition module 42 is used for analyzing the recognition feature data of the user U so as to obtain identity verification data and to compare the identity verification data with the identification data 91 of a plurality of interactors in order to obtain the corresponding hearing parameter data 92. More specifically, the recognition feature data received by the input device 30 will be transmitted to the processing unit 40, and the identity recognition module 42 will first analyze the recognition feature data, so as to obtain identity verification data. For example, if the received recognition feature data 70 is a facial image of the user U, the identity recognition module 42 will be able to identify and analyze features of the facial image and obtain the facial image data of the user U according to the analysis result; in this case, the facial image data is the abovementioned identity verification data. If the received recognition feature data 70 is a fingerprint of the user U, the identity recognition module 42 will be able to identify and analyze features of the fingerprint and obtain the fingerprint data of the user U according to the analysis result; in this case, the fingerprint data is the abovementioned identity verification data. If the received recognition feature data 70 is a voice message 80 (a sound) made by the user U, the identity recognition module 42 will be able to identify and analyze voiceprint features of the sound of the user U and obtain the voiceprint data of the user U according to the analysis result; in this case, the voiceprint data is the abovementioned identity verification data.

After obtaining the identity verification data, the identity recognition module 42 will then compare the identity verification data with the identification data 91 of the plurality of interactors stored in the memory 20. Once the identity verification data is matched with the identification data 91 of one of the interactors, the invention will obtain the corresponding hearing parameter data 92 by means of a look-up table. According to a corresponding relationship table as shown in FIG. 2, for example, if the obtained identity verification data is "10101 BF051", the identity recognition module 42 will determine that the user is the interactor U2 by means of the look-up table and further find the corresponding hearing parameter data 92, which is "1010101010102020".

According to one embodiment of the present invention, the answer message acquisition module 43 is used for acquiring a corresponding original answer voice message appropriate for answering the voice message 80, wherein the corresponding relationship between the original answer voice message and the voice message 80 is pre-defined. In this embodiment, the answer message acquisition module 43 will perform semantic analysis of the voice message 80 and then search for a corresponding original answer voice message according to the analysis result. For example, if the voice message 80 made by the user U is "Turn on the air conditioner", the original answer voice message in response to such voice message 80 could be designed as, "The current temperature is X degrees Celsius. Please set a target temperature" (wherein "X" refers to an actual room temperature). Therefore, in the event that the answer message acquisition module 43 analyzes that the voice message 80 refers to "Turn on the air conditioner" or a similar semantic meaning, the answer message acquisition module 43 will then correspondingly search for "The current temperature is X degrees Celsius. Please set a target temperature" as the original answer voice message.

Please note that the original answer voice message not only can be obtained by the answer message acquisition module 43 according to the semantic analysis result but also can be obtained from a server system (not shown in figures) in other embodiments. In more detail, in other embodiments, the electronic device 1 can connect to a server system with a function of smart voice service, and the answer message acquisition module 43 will first transmit the voice message 80 to the server system, so that the server system will perform semantic analysis on the voice message 80, and then search for a corresponding original answer voice message appropriate for answering the voice message 80 according to the analysis result; and then the answer message acquisition module 43 will receive the original answer voice message from the server system. Techniques of performing semantic analysis on human speech and returning an appropriate answer according to an analysis result are well known by those skilled in related voice processing technical arts (such as Siri software developed by Apple Inc., or text-to-speech (TTS) related publications); therefore, there is no need for further description.

In one embodiment of the present invention, the sound adjustment module 44 is used for adjusting a sound frequency of the original answer voice message according to the hearing parameter data 92 analyzed and obtained by the identity recognition module 42, so as to generate an adjusted answer voice message. After the adjusted answer voice message is generated, the speaker 10 can selectively output either the original answer voice message or the adjusted answer voice message, or output both the original answer voice message and the adjusted answer voice message in turns. Because the sound frequency of the adjusted answer voice message is adjusted based on the hearing state of the user U, the playback sound of the speaker 10 outputting the adjusted answer voice message can be appropriate for the hearing state of the user U. Because the sound frequency of the original answer voice message is not adjusted, the playback sound of the speaker 10 outputting the original answer voice message can be appropriate for the hearing state of an average person, such that other people around the user U can also clearly hear the voice answered by the electronic device 1.

In one embodiment of the present invention, the control module 45 is used for controlling function executions of the controlled electronic device 60 according to a control signal. The control signal is generated according to a result of analyzing the voice message 80. For example, the controlled electronic device 60 is an air conditioner; therefore, if the answer message acquisition module 43 analyzes the voice message 80 as "Turn on the air conditioner", the answer message acquisition module 43 will generate a control signal and transmit the control signal to the control module 45. After the control module 45 receives the control signal, it will turn on the air conditioner according to the control signal. Further, in other embodiments, if the semantic analysis is conducted by the server system, then the server system can generate the control signal according to the semantic analysis result and transmit it to the answer message acquisition module 43, such that the answer message acquisition module 43 will transmit the control signal to the control module 45.

Figure 3:
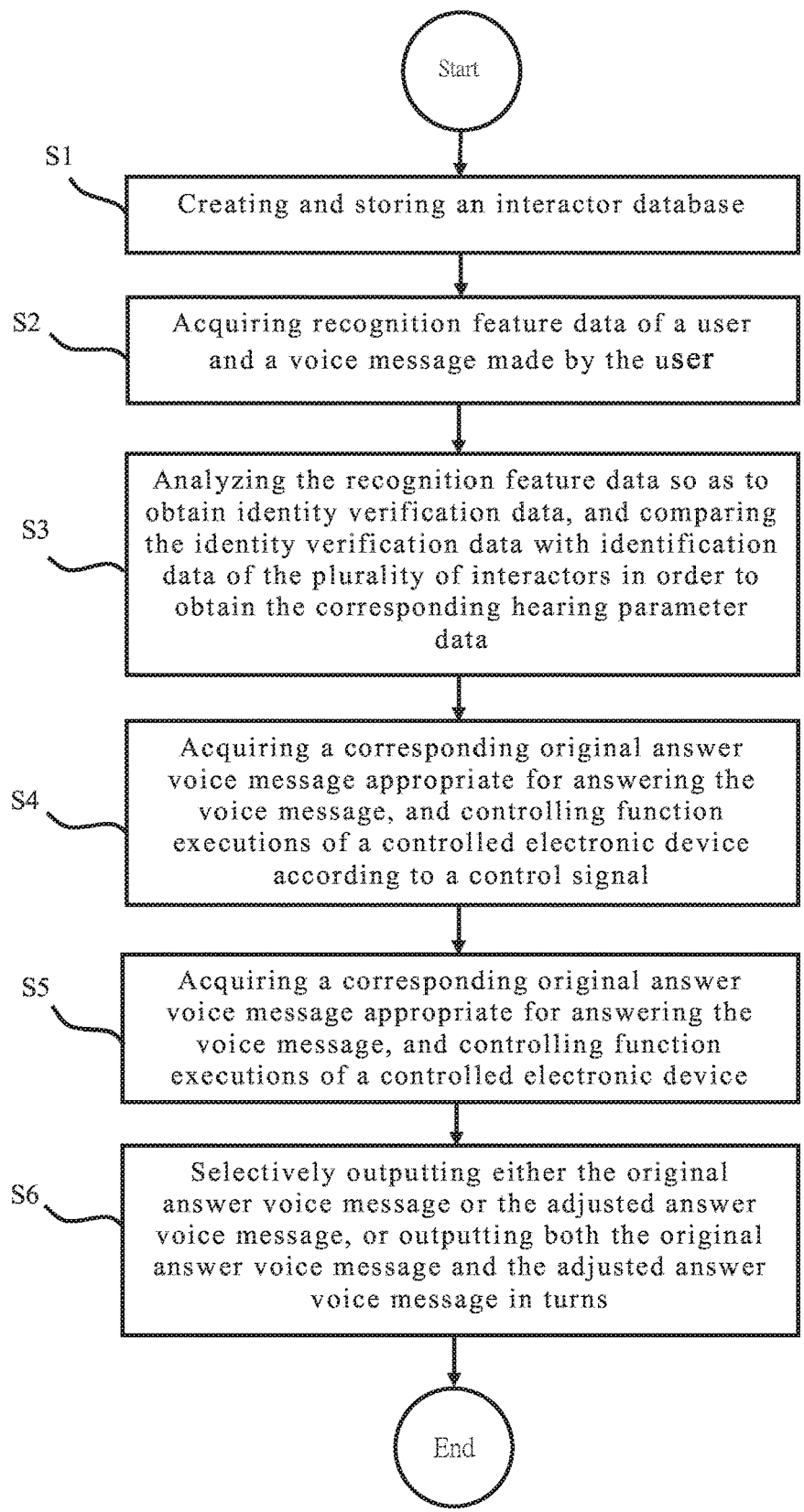
FIG. 3 illustrates a flowchart of a method of adjusting output sound according to the present invention.

Next, please refer to FIG. 1 to FIG. 3, wherein FIG. 3 illustrates a flowchart of the method of adjusting output sound according to the present invention. Each of the steps shown in FIG. 3 will be explained sequentially with reference to FIG. 1 and FIG. 2.

First, the method performs step S1: creating and storing an interactor database.

The method of adjusting output sound according to the present invention is applicable for being used in the electronic device 1 with a function of smart voice service as shown in FIG. 1, and is used for adjusting the frequency of output sound of the electronic device 1 according to the hearing state of the user. In order to identify a user who is currently using the electronic device 1 and determine his/her hearing state, the first step of the method is to create an interactor database. The interactor database 90 includes identification data 91 and hearing parameter data 92 of a plurality of interactors (possible potential users). The hearing parameter data 92 includes hearable minimum volume data of each of the interactors with respect to sounds at different frequencies. As shown in FIG. 2, in this embodiment, the identification data 91 includes facial image data 911, fingerprint data 912 and voiceprint data 913 of the interactors. The data can be inputted by potential interactors. Please refer to the abovementioned embodiments for more details of the creation of the interactor database 90.

The method then performs step S2: acquiring recognition feature data of a user and a voice message made by the user.

According to the embodiment of the present invention, before the user utilizes the smart voice service provided by the electronic device 1, the electronic device 1 can acquire the recognition feature data of the user via the input device 30. The recognition feature data can be, but not limited to, the facial image, fingerprint or voiceprint of the user U. More specifically, the input device 30 of the electronic device 1 includes a microphone 31, a camera 32, a fingerprint acquisition device 33 and a touch screen 34. The microphone 31 is used for receiving a voice message 80 (a sound) made by the user U; the camera 32 is used for acquiring a facial image of the user U; and the fingerprint acquisition device 33 is used for acquiring a fingerprint of the user U.

The method then performs step S3: analyzing the recognition feature data so as to obtain identity verification data, and comparing the identity verification data with identification data of the plurality of interactors in order to obtain the corresponding hearing parameter data.

After completing step S2, the identity recognition module 42 of the processing unit 40 can identify and analyze the obtained recognition feature data so as to obtain identity verification data. If the camera 32 acquires the facial image of the user U, the identity recognition module 42 will identify features of the facial image and obtain the facial image data of the user U according to the analysis result; in this case, the facial image data is the abovementioned identity verification data. Or, if the user U utilizes the fingerprint acquisition device 33 to input his/her own fingerprint, the identity recognition module 42 will identify features of the fingerprint and obtain the fingerprint data of the user U according to the analysis result; in this case, the fingerprint data is the abovementioned identity verification data. Moreover, if the user U makes a voice message 80 (a sound) toward the microphone 31, the identity recognition module 42 will analyze voiceprint features of the sound of the user U and obtain the voiceprint data of the user U according to the analysis result; in this case, the voiceprint data is the abovementioned identity verification data.

After obtaining the identity verification data, the identity recognition module 42 will then compare the identity verification data with the identification data 91 of the plurality of interactors, so as to obtain the corresponding hearing parameter data 92. More specifically, after the identity recognition module 42 receives the identity verification data via the above means, it will then compare the identity verification data with the identification data 91 of the plurality of interactors stored in the memory 20. Once the identity verification data matches with the identification data 91 of one of the interactors, the invention will obtain the corresponding hearing parameter data 92 according to the matching identification data 91 by means of the look-up table.

Next, the method performs step S4: acquiring a corresponding original answer voice message appropriate for answering the voice message, and controlling function executions of a controlled electronic device according to a control signal.

According to the embodiment of the present invention, after the microphone 31 receives the voice message 80 made by the user U, the answer message acquisition module 43 of the processing unit 40 will perform semantic analysis on the voice message 80 and then search for a corresponding original answer voice message appropriate for answering the voice message 80 according to the analysis result, wherein the corresponding relationship between the voice message 80 and the original answer voice message is pre-defined. For example, if the voice message 80 is "Turn on the air conditioner", the original answer voice message in response to such voice message 80 could be designed as "The current temperature is X degrees Celsius. Please set a target temperature" (wherein "X" refers to an actual room temperature). Please note that the original answer voice message not only can be obtained by the answer message acquisition module 43 according to the semantic analysis result but also can be obtained from a server system (not shown in figures) in other embodiments. In more detail, in other embodiments, the electronic device 1 can connect to a server system with a function of smart voice service, and the answer message acquisition module 43 will first transmit the voice message 80 to the server system, so that the server system can perform semantic analysis on the voice message 80 and then search for a corresponding original answer voice message appropriate for answering the voice message 80 according to the analysis result; then the answer message acquisition module 43 will receive the original answer voice message from the server system.

Furthermore, the answer message acquisition module 43 will also generate a control signal according to the semantic analysis result and transmit the control signal to the control module 45. The control module 45 can control function executions of the controlled device 60 according to the control signal, such as turning on, turning off or performing specific functions of the controlled device 60.

Then the method performs step S5: adjusting the original answer voice message according to the hearing parameter data, so as to generate an adjusted answer voice message.

After the answer message acquisition module 43 acquires the original answer voice message, the sound adjustment module 44 of the processing unit 40 will adjust the sound frequency of the original answer voice message according to the hearing parameter data 92 obtained by the identity recognition module 42, so as to generate an adjusted answer voice message.

Finally, the method performs step S6: selectively outputting either the original answer voice message or the adjusted answer voice message, or outputting both the original answer voice message and the adjusted answer voice message in turns.

After completing step S5, the speaker 10 of the electronic device 1 can selectively output either the original answer voice message or the adjusted answer voice message, or the speaker 1 can output both the original answer voice message and the adjusted answer voice message in turns, depending on the preference of the user U.

According to the abovementioned description, the electronic device with a function of smart voice service is capable of identifying a user who is currently using the voice service and of adjusting the frequency of output sound to answer according to the hearing state of the user, so that the user can clearly hear the answer voice message.

Although the present invention has been explained in relation to its preferred embodiments, it is to be understood that many other possible modifications and variations can be made without departing from the spirit and scope of the invention as hereinafter claimed.

What is claimed is:

1. An electronic device with a function of smart voice service, comprising:
 a speaker;
 a memory;
 an input device, used for acquiring a recognition feature data of a user, wherein the input device includes a microphone for receiving a voice message made by the user; and
 a processing unit, electrically connected to the speaker, the memory and the input device, the processing unit comprising:
  a file creation module, used for creating an interactor database and storing the interactor database in the memory, wherein the interactor database includes an identification data and a hearing parameter data of a plurality of interactors;
  an identity recognition module, used for analyzing the recognition feature data so as to obtain an identity verification data, and for comparing the identity verification data with the identification data of the plurality of interactors in order to obtain the corresponding hearing parameter data;

an answer message acquisition module, used for acquiring a corresponding original answer voice message appropriate for answering the voice message; and a sound adjustment module, used for adjusting the original answer voice message according to the hearing parameter data, so as to generate an adjusted answer voice message for the speaker to output the adjusted answer voice message.

2. The electronic device as claimed in claim 1, wherein the electronic device is connected to a server system, such that the answer message acquisition module first transmits the voice message to the server system, and then the server system obtains the original answer voice message, wherein the original answer voice message is obtained by the server system according to a result of analyzing the voice message.

3. The electronic device as claimed in claim 1, wherein the answer message acquisition module analyzes the voice message and obtains the original answer voice message according to an analysis result.

4. The electronic device as claimed in claim 1, wherein the identification data comprises a facial image data, a fingerprint data or a voiceprint data, and the recognition feature data includes a facial image, a fingerprint or a voice of the user.

5. The electronic device as claimed in claim 1, wherein the hearing parameter data includes a hearable minimum volume data of each of the interactors with respect to sounds at different frequencies, and the hearing parameter data is obtained by the file creation module according to an age data and a gender data of each of the interactors.

6. The electronic device as claimed in claim 1, wherein the speaker selectively outputs either the original answer voice message or the adjusted answer voice message, or outputs both the original answer voice message and the adjusted answer voice message in turns.

7. The electronic device as claimed in claim 2, wherein the electronic device is electrically connected to at least one controlled electronic device, and the processing unit further comprises a control module used for controlling function executions of the at least one controlled electronic device according to a control signal, where the control signal is generated according to a result of analyzing the voice message.

8. The electronic device as claimed in claim 3, wherein the electronic device is electrically connected to at least one controlled electronic device, and the processing unit further comprises a control module used for controlling function executions of the at least one controlled electronic device according to a control signal, where the control signal is generated according to a result of analyzing the voice message.

9. A method of adjusting output sound, applicable for being used in an electronic device with a function of smart voice service, the method comprising the following steps:

creating and storing an interactor database, wherein the interactor database includes an identification data and a hearing parameter data of a plurality of interactors;

acquiring a recognition feature data of a user and a voice message made by the user;

analyzing the recognition feature data so as to obtain an identity verification data, and comparing the identity verification data with the identification data of the plurality of interactors in order to obtain the corresponding hearing parameter data;

acquiring a corresponding original answer voice message appropriate for answering the voice message;

adjusting the original answer voice message according to the hearing parameter data, so as to generate an adjusted answer voice message; and outputting the adjusted answer voice message or the original answer voice message.

10. The method as claimed in claim 9, wherein the electronic device is connected to a server system, and the step of acquiring the original answer voice message includes:

sending the voice message to the server system, such that the server system obtains the original answer voice message according to a result of analyzing the voice message; and receiving the original answer voice message from the server system.

11. The method as claimed in claim 9, wherein the step of acquiring the original answer voice message includes:

analyzing the voice message, so as to obtain the original answer voice message according to an analysis result.

12. The method as claimed in claim 9, wherein the identification data comprises a facial image data, a fingerprint data or a voiceprint data; and the recognition feature data includes a facial image, a fingerprint or a voice of the user.

13. The method as claimed in claim 9, wherein the hearing parameter data includes a hearable minimum volume data of each of the interactors with respect to sounds at different frequencies, and the hearing parameter data is obtained by a file creation module according to an age data and a gender data of each of the interactors.

14. The method as claimed in claim 9, wherein the step of outputting the adjusted answer voice message or the original answer voice message comprises selectively outputting either the original answer voice message or the adjusted answer voice message, or outputting both the original answer voice message and the adjusted answer voice message in turns.

15. The method as claimed in claim 10, wherein the electronic device is electrically connected to at least one controlled electronic device, and the method further comprises the following step:

controlling function executions of the at least one controlled electronic device according to a control signal, where the control signal is generated according to a result of analyzing the voice message.

16. The method as claimed in claim 11, wherein the electronic device is electrically connected to at least one controlled electronic device, and the method further comprises the following step:

controlling function executions of the at least one controlled electronic device according to a control signal, where the control signal is generated according to a result of analyzing the voice message.

* * * * *